Patented Dec. 22, 1953

2,663,618

UNITED STATES PATENT OFFICE 2,663,618

LEACHING MANGANESE ORE

Bernard R. Babbitt and Charles B. Kunz, Minneapolis, Minn., assignors to Manganese Chemicals Corporation, Minneapolis, Minn., a corporation of Minnesota No Drawing. Application August 23, 1951,
Serial No. 243,350

7 Claims. (Cl. 23—61)

This invention relates to the leaching art, and is concerned with the provision of an improved technique in the leaching of manganous oxide-containing materials, in particulate form, with aqueous leaching solutions containing compounds of ammonia and carbon dioxide.

The general process to which the present improved technique is applicable includes the steps of establishing a column of a particulate manganous oxide-containing material supported on a foraminous false bottom in a generally vertical leach tower, and downwardly forcing through the column, under superatmospheric pressure, a body of leaching liquor, consisting essentially of an ammoniacal aqueous solution of an ammonium salt such as ammonium carbamate, whereby to obtain in solution an anionic complex of manganese. Specifically, the starting material is a manganes ore material which has been subjected to reduction roasting under conditions to convert its initial content of manganese dioxide to manganous oxide.

In carrying out, on an industrial scale, the process generally described above it was found advisable, if not necessary, to size the particulate material composing the column, in order (a) to provide a permeable bed through which the leaching liquor could be forced at economically acceptable speeds, at pressures within reasonable limits, and (b) to minimize channeling of the leaching solution. The technologically conventional mode of sizing such materials was (and is) wet grinding with a conventional wet classification such as is obtained in a Fahrenwald sizer, and the wet mode was here adopted. It should be noted in this connection that grinding and sizing by dry methods were impractical or inoperable because reoxidation of the manganous oxide content, when employing such dry methods, could not in practice be prevented.

It was found, however, that the moist, ground and sized ore, which after having been charged into the leach tank contained upwards of 20% by weight of water, could not be leached satisfactorily. The presence of moisture on the surface and in pores of the ore particles apparently inhibited penetration of the leaching liquor into the particles: whatever the explanation, the fact was that passage of the leaching liquor through the column of wet or moist ore particles failed to effect the removal of any significant amount of manganese, and subsequent examination of the ore particles indicated that their pores had been sealed by a precipitate.

It was discovered, however, that if the "moisture" on the moist ore particles were ammonium hydroxide solution, instead of water per se, the ensuing leaching treatment would be successful, with extractions of up to 90% and 95% (i. e., extraction efficiencies equal to those secured in laboratory-scale leaching of dry samples of ore) being obtainable. Thus it was found that if moist particles of the reduced ore material were treated with gaseous ammonia the "inhibiting" effect of the water—as regards ensuing leaching of manganese with the ammoniacal leaching liquor above described—would be nullified. It further was found that this result readily could be brought about by carrying out the grinding and sizing of the reduced ore material in the wet way, removing loosely associated water from the sized material as by draining, charging it in moist state into the leach tower, contacting the wet or moist ore particles with gaseous ammonia by passing a current of gas rich in ammonia into the column of ore particles, and then initiating the "normal" tower leaching procedure above described. In practice, it appears not to be necessary to saturate the whole column with ammonia: it appears sufficient that the moisture on and in the ore particles constituting the top portion of the column (i. e., that end of the latter at which the leaching liquor is to be introduced) is saturated with ammonia.

The "gas rich in ammonia" may, as inferred, consist of ammonia only, or it may be a gas mixture composed of ammonia admixed with another gas (e. g., carbon dioxide) in minor proportion. Preferably there is used, for this inhibition, nullifying purpose, the $NH_2-CO_2$ gas mixture obtained by "steaming" a column of previously leached ore, wet with aqueous solution rich in ammonia and carbon dioxide; such a gas mixture may consist essentially of ammonia and carbon dioxide in the approximate molal ratio of 3.5–7.0 to 1.

The invention will now be described in the following specific example:

The leaching tower, a vessel approximately 72 inches in diameter and approximately 120 inches in height, was provided with a permeable false bottom, an inlet opening at the top and an outlet opening at the bottom beneath the permeable false bottom.

The starting material was a manganese-containing ore which, after reductive roasting, analyzed as follows:

|  | Per cent |
|---|---|
| MnO | 13.0 |
| $Fe_3O_4$ | 44.0 |
| $SiO_2$ | 42.0 |

A supply of this roasted material was subjected to wet grinding and wet classification in a Fahrenwald sizer, to produce supplies of wet coarse (i. e., −20 to +60 mesh), medium (i. e., −60 to +150 mesh), and fine (i. e., −150 to +200 mesh) "sands."

The leaching tower was charged with wet ore sands (of any one of the above three size bands), forming therein a column approximately 100 inches tall and containing approximately 20,000 pounds, dry weight, of the ore, the sands being transported to the tower in the form of an aqueous slurry. Excess water was forced out of the column by blowing a current of air downwardly therethrough. At this stage, the column of particulate ore material still contained about 20% by weight of water in the pores and adhering to the surfaces of the particles.

It is to be commented, here, that when using rather accurately sized material the void space is fairly constant whatever the size band selected. The finer the sands, the more pressure is required for forcing a unit amount of leaching solution through a unit mass of sands in a predetermined time interval; but higher back pressure associated with use of finer sands may, if desirable, be compensated for by using a shallower bed in order to keep the pressure within practical limits.

In a similar leaching tower, a similar column of particulate material—in this case ore which had been leached and which was "wet" with about 20% by weight of ammoniacal mother liquor, e. g., an aqueous solution substantially free from manganese and containing about 10.5 mols per liter of $NH_3$ and about 3.0 mols per liter of $CO_2$—was "steamed" by passing a current of steam upwardly through the column to dispel therefrom a mixture of gaseous ammonia and carbon dioxide. This gaseous mixture was diverted to the top of the first mentioned leaching tower and, in being forced downwardly through the wet ore column, was substantially absorbed by the moisture on and in the particles constituting that column, forming in situ an aqueous solution containing ammonia and carbon dioxide.

Leaching of the gas-treated ore was then initiated by downwardly forcing therethrough, at approximately the rate of 28.0 gals./minute (i. e., approximately 1 gal. per each 1 sq. ft. of area per minute), a current of leaching liquor containing, besides water, about 18.0 mols./liter of ammonia and about 4.0 mols./liter of carbon dioxide in the form of ammonium carbamate dissolved in aqueous ammonium hydroxide. Passage of the leaching liquor was terminated after about 160 minutes, when it was found that the liquid exiting from the bottom of the column contained substantially no dissolved manganese. From the leaching liquor which had been passed through the column there was precipitated manganous carbonate in the amount of 3800 pounds, dry weight, while the ore residue contained the equivalent of 400 pounds of manganese carbonate, indicating a 90% leaching efficiency.

Thereafter, the leaching liquor adhering to the leached ore was displaced from the latter by means of a current of hot mother liquor (the aforementioned aqueous solution substantially free from manganese and containing about 10.5 mols./liter of $NH_3$ and about 3.0 mols./liter of $CO_2$), excess of the latter was drained from the column of leached ore, and the latter—wet with the mother liquor—was "steamed" to distil off its contents of ammonia and carbon dioxide, for use of the latter in pretreating a third column of wet ore about to be subjected to leaching treatment.

As was noted above, the invention is not restricted to pretreatment of the water-wet material with $NH_3$-$CO_2$ gas mixture: the pretreating gas may be ammonia per se, derived from any suitable source, or it may consist largely of ammonia in association with a minor proportion of a second gas other than $CO_2$, e. g., nitrogen, air or carbon monoxide. Moreover, the treatment of the water-wet ore particles with a gas rich in ammonia may be followed by leaching with an ammoniacal aqueous solution of an ammonium salt other than the carbamate, e. g., with an ammoniacal solution of ammonium sulphate or ammonium chloride.

It is to be noted, also, that the step of displacing leaching liquor (on the leached ore) by hot mother liquor may be dispensed with, and the ammonia and carbon dioxide of the adhering leaching solution itself may be distilled off and diverted to the column of water-wet ore about to be leached. Displacement with hot mother liquor has the advantage of saving heat units contained in said mother liquor; also the advantage of having to volatilize off somewhat smaller amounts of $NH_3$ and $CO_2$ than would be the case were the displacement step omitted.

We claim:

1. In the process of leaching manganese from water-wet particulate ore material containing manganous oxide using as leaching solution an ammoniacal solution of an ammonium salt, the step of conditioning the water-wet ore particles for subsequent leaching which consists in treating at least a substantial part of the water-wet ore particles with a gas rich in ammonia prior to initiating the leaching operation.

2. Process which comprises establishing a column of water-wet particulate ore material containing manganous oxide, treating the water-wet ore particles with a gas rich in ammonia, and thereafter subjecting the column of ore material to leaching treatment with an ammoniacal solution of an ammonium salt.

3. Process which comprises establishing a column of water-wet particulate ore material containing manganous oxide, treating the water-wet ore particles with an ammonia-carbon dioxide gas mixture rich in ammonia, and thereafter subjecting the column of ore material to leaching treatment with an ammoniacal solution of an ammonium salt.

4. Process which comprises establishing a column of water-wet particulate ore material containing manganous oxide, passing in one direction into the column a current of gas rich in ammonia in an amount sufficient to saturate with ammonia the water adhering to the surfaces and in the pores of the ore particles constituting at least that end portion of the column at which the gas current was introduced, and thereafter subjecting the column of ore material to leaching treatment with an ammoniacal solution of ammonium carbamate.

5. Process which comprises establishing a column of water-wet particulate ore material containing manganous oxide, said column comprising a series of alternate layers of coarse, medium and fine particles of the ore material, passing in one direction into the column a current of a gas mixture consisting essentially of ammonia and carbon dioxide, the proportion of ammonia in said gas mixture being greater than that of the carbon dioxide, in an amount sufficient to saturate with ammonia and carbon dioxide the water adhering to the surfaces and in the pores of the ore particles constituting at least that end portion of the column at which the gas current was introduced, and thereafter subjecting the column of ore material to leaching treatment with an ammoniacal solution of ammonium carbamate.

6. Process which comprises establishing a column of water-wet particulate ore material containing manganous oxide, passing in one direction into the column a current of gas rich in ammonia in an amount sufficient to saturate with ammonia the water adhering to the surfaces and in the pores of the ore particles constituting at least that end portion of the column at which the gas current was introduced, thereafter subjecting the column of ore material to leaching treatment with an ammoniacal solution of ammonium carbamate, establishing a second column of said water-wet particulate ore material, terminating the leaching treatment of the first mentioned column and separating from the latter the bulk of the leaching solution associated therewith, passing a current of steam through the first mentioned column to distil ammonia and carbon dioxide from the ore particles thereof wet with solution containing ammonia and carbon dioxide, and conducting the distilled-off ammonia and carbon dioxide downwardly into said second column.

7. Process which comprises establishing a column of water-wet particulate ore material containing manganous oxide, passing in one direction into the column a current of gas rich in ammonia in an amount sufficient to saturate with ammonia the water adhering to the surfaces and in the pores of the ore particles constituting at least that end portion of the column at which the gas current was introduced, thereafter subjecting the column of ore material to leaching treatment with an ammoniacal solution of ammonium carbamate, establishing a second column of said water-wet particulate ore material, terminating the leaching treatment of the first mentioned column and separating from the latter the bulk of the leaching solution associated therewith, displacing residual leaching solution from said first mentioned column by forcing through the latter a current of hot mother liquor containing ammonia and carbon dioxide, draining mother liquor from the first mentioned column, passing a current of steam through the first mentioned column to distil ammonia and carbon dioxide from the ore particles thereof wet with mother liquor, and conducting the distilled-off ammonia and carbon dioxide downwardly into said second column.

BERNARD R. BABBITT.
CHARLES B. KUNZ.

References Cited in the file of this patent

UNITED STATES PATENTS

| Number | Name | Date |
|---|---|---|
| 1,114,018 | Moore | Oct. 20, 1914 |
| 1,204,843 | Bretherton et al. | Nov. 14, 1916 |
| 1,889,021 | Kobe | Nov. 29, 1932 |
| 1,909,757 | Coxon | May 16, 1933 |
| 1,932,413 | Laury | Oct. 31, 1933 |
| 1,937,508 | Bradley | Dec. 5, 1933 |
| 1,947,457 | Bradley | Feb. 20, 1934 |
| 1,951,341 | Bradley | Mar. 20, 1934 |
| 2,608,463 | Dean | Aug. 26, 1952 |
| 2,608,466 | Fox | Aug. 26, 1952 |
| 2,616,781 | Forward | Nov. 4, 1952 |
| 2,621,107 | Dean et al. | Dec. 9, 1952 |
| 2,625,462 | Fox | Jan. 13, 1953 |

FOREIGN PATENTS

| Number | Country | Date |
|---|---|---|
| 319,605 | Great Britain | Sept. 19, 1929 |

OTHER REFERENCES

Mellor: "Comprehensive Treatise on Inorganic and Theoretical Chemistry," vol. 2, pages 792, 798 (1922), Longmans, Green and Co., N. Y. C.